United States Patent
Väänänen et al.

(10) Patent No.: US 7,573,818 B2
(45) Date of Patent: Aug. 11, 2009

(54) METHOD AND EQUIPMENT FOR CONTROLLING THE CONGESTION MANAGEMENT AND SCHEDULING OF TRANSMISSION-LINK CAPACITY IN PACKET-SWITCHED TELECOMMUNICATIONS

(75) Inventors: Janne Väänänen, Espoo (FI); Mikko Laulainen, Helsinki (FI)

(73) Assignee: Tellabs Oy, Espoo (FI)

( * ) Notice: Subject to any disclaimer, the term of this patent is extended or adjusted under 35 U.S.C. 154(b) by 503 days.

(21) Appl. No.: 10/575,706

(22) PCT Filed: Oct. 13, 2004

(86) PCT No.: PCT/FI2004/000610
§ 371 (c)(1),
(2), (4) Date: Apr. 13, 2006

(87) PCT Pub. No.: WO2005/039122
PCT Pub. Date: Apr. 28, 2005

(65) Prior Publication Data
US 2007/0058536 A1 Mar. 15, 2007

(30) Foreign Application Priority Data
Oct. 14, 2003 (FI) .................................. 20031501

(51) Int. Cl.
*H04L 12/00* (2006.01)
(52) U.S. Cl. ...................................... 370/235; 370/428
(58) Field of Classification Search ................. 370/235, 370/232, 230.1, 230, 229, 428; 709/235, 709/232, 230
See application file for complete search history.

(56) References Cited

U.S. PATENT DOCUMENTS
2002/0080727 A1* 6/2002 Kim et al. .................... 370/252
(Continued)

FOREIGN PATENT DOCUMENTS
EP 1 137 227 A2 9/2001
(Continued)

*Primary Examiner*—Kwang B Yao
*Assistant Examiner*—Andrew Lai
(74) *Attorney, Agent, or Firm*—Birch, Stewart, Kolasch & Birch, LLP

(57) ABSTRACT

The invention relates to a method and equipment for controlling the congestion management and transmission-link-capacity scheduling in packet-switched telecommunications, in such a way that 1) it is possible to define what share of the capacity of the transmission link will be reserved for traffic representing a specific service level class, and 2) it is possible to define the weighting coefficient that the portion of the traffic exceeding the reservation of each service level class will use to compete for the portion of the capacity of the transmission link that is not reserved, or that is reserved but is not being used momentarily by traffic entitled to the reservation, and 3) it is possible to use overbooking, in such a way that the reduction in service quality due to overbooking affects only the service level class in which overbooking is used, and 4) it is possible to prevent an increase in delays detrimental to traffic-flow control even in a congestion situation arising from overbooking. The invention is based on measuring the traffic flow that comes to be scheduled, in which the flow is formed of packets representing a specific service level class arriving in the queue, or some of the relevant packets, and on controlling the operation of the scheduler and congestion limitation mechanism on the basis of the measurement results.

12 Claims, 3 Drawing Sheets

U.S. PATENT DOCUMENTS

| | | | |
|---|---|---|---|
| 2002/0097734 A1 | 7/2002 | Amou et al. | |
| 2002/0176358 A1* | 11/2002 | Assa et al. | 370/229 |
| 2003/0058802 A1* | 3/2003 | Jones et al. | 370/252 |
| 2003/0231594 A1* | 12/2003 | Xu et al. | 370/236 |
| 2004/0190550 A1* | 9/2004 | Saikusa et al. | 370/466 |
| 2004/0258072 A1* | 12/2004 | Deforche | 370/395.4 |
| 2005/0094643 A1* | 5/2005 | Wang et al. | 370/395.4 |

FOREIGN PATENT DOCUMENTS

| | | |
|---|---|---|
| EP | 1345365 A2 | 9/2003 |
| GB | 2 394 856 A | 5/2004 |
| WO | WO-00/28705 A1 | 5/2000 |
| WO | WO-02/088879 A2 | 11/2002 |
| WO | WO-03/052556 A2 | 6/2003 |

* cited by examiner

The SFQ (Start-time Fair Queuing) method referred to in source [1], for example, can be used as the afq algorithm. The weighting coefficient is determined on the basis of the variables q and p, in which q depends on the service level class (aG+E, bG+E, BE) and p, in turn, on the division of the packets into sub-groups.

METHOD AND EQUIPMENT FOR CONTROLLING THE CONGESTION MANAGEMENT AND SCHEDULING OF TRANSMISSION-LINK CAPACITY IN PACKET-SWITCHED TELECOMMUNICATIONS

The present invention relates to a method, according to Claim 1, for controlling the congestion management and scheduling of transmission-link capacity in packet-switched telecommunications.

The invention also relates to equipment, according to Claim 8, for controlling the congestion management and scheduling of transmission-link capacity in packet-switched telecommunications.

In this publication, the following abbreviations are used in the descriptions of both the prior art and the invention:

BE Service level class for applications, which are able to exploit the momentarily available capacity of a data transmission network, but for which the capacity of the data transmission network is not reserved (Best Effort),
CoS Service level class (Class of Service),
DSCP Data carried by a packet, stating the service level class to which the packet in question belongs (Differentiated Services Code Point),
FIFO First In First Our discipline,
aG+E A service level class for applications, which are able to exploit the momentarily available capacity of a data transmission network, and for which a specific data transmission capacity is reserved (Guaranteed rate and Best Effort),
bG+E A service level class that is similar to aG+E, but, in service level class bG+E, an overbooking ratio of a different magnitude to that in service level class aG+E can be used, if desired,
[P] {p} A variable expressing an internal sub-group (e.g., drop preference) of a service level class,
OBR Overbooking Ratio,
QoS Quality of service,
q Variable expressing the service level class,
SFQ Start-time Fair Queuing, one scheduling method [1] based on a weighting coefficient,
SLA Service Level Agreement,
wfq a general term (weighted fair queuing) applied to a scheduling method based on a weighting coefficient,
WFQ Weighted Fair Queuing, one scheduling method [1] based on a weighting coefficient,
WRED Weighted Random Early Detection, a congestion limitation method [3, 4] based on a weighting coefficient.

In a packet-switched telecommunications system, it is often preferable for the packets being transmitted to be classified as belonging to different service level classes (CoS), according to the requirements of the applications used by the telecommunications service, and, on the other hand, according to the kind of agreements on the service quality (SLA) the telecommunications service provider has made with its customers (end users). For example, in the case of normal telephone applications, it is essential for the data transmission speed required by the application to be available for the time required, for the transmission delay to be sufficiently small, and the variation in the transmission delay to be sufficient low. In telephone applications, there is no advantage in being able to momentarily increase the data transmission speed provided for an application, if the loading on the telecommunications network is small at the time in question. On the other hand, when downloading web-pages, it is extremely advantageous to be able to exploit the full, even momentarily available, transmission capacity of the network.

It is often advantageous to use overbooking for some service level classes. An application representing a specific service level class, for which a specific transmission speed [bit/s] is ordered by the service level agreement (SLA), will be examined. The telecommunications network is required to provide the transmission speed ordered for the application in question, with a probability of 99.99%. In order to meet this demand, the data transmission capacity [bit/s] is reserved in the data transmission links and other network elements for applications using the service level class in question. When using overbooking, the data transmission capacity reserved in a specific link or other network element is lower than the total sum of the transmission speeds ordered in the service level agreements (SLA) in the case of the relevant part of the network. Overbooking naturally increases the probability of breaching the service level agreement (SLA). However, in practice it is improbable that even nearly all of the end users using the specific service level class will attempt to simultaneously utilize the transmission speed defined in their service level agreement. From the point of view of the service provider, overbooking is profitable, as long as the payments from end users received with the aid of overbooking (thus selling more transmission capacity) are greater than the costs incurred by the increase in breaches of the service level agreements. The overbooking ratio (OBR) expresses the ratio of the total sum of the transmission speeds ordered for specific traffic to the data transmission capacity reserved for the traffic in question. The overbooking ratio can be network element specific.

If overbooking is used in some service level class, it should be arranged so that the overbooking used in the specific service level class does not reduce the quality of service in other service level classes. Service quality reduction can appear, for example, in the form of increased packet loss, of increased transmission delays and delay variations, or in a reduced ability of the application to utilize the available transmission capacity of the network at any time. The risk of service quality reduction caused by overbooking should affect only the service level class, in which the overbooking is used. In this publication, overbooking meeting such conditions is termed controlled overbooking.

The following examines a situation, in which the telecommunications services provides the following types of service level class:

aG+E (Guaranteed rate and Best Effort) for an application, for which a service level agreement (SLA) is used to order a specific (minimum) transmission speed [bit/s] and for which the momentary data transmission speed provided is increased exploiting the data transmission system capacity available at each time. A data transmission capacity [bit/s] is reserved in the network elements for applications representing the aG+E service level class.

bG+E: a service level class corresponding to aG+E, but in the service class bG+E it is possible, if desired, to use an overbooking ratio ($OBR_{bG+E}$) of a different magnitude to that in the service level class aG+E ($OBR_{aG+E}$).

BE (Best Effort): for applications, for which a data transmission capacity is neither reserved in the network elements, nor, on the other hand, is a (minimum) transmission speed ordered using a service level agreement (SLA), but for which the telecommunications system's capacity available at any time is exploited.

FIG. 1 shows one way according to the prior art of scheduling the capacity of a common transmission link for traffic flows representing the aforementioned service level classes (aG+E, bG+E, or BE). The operation of the system shown in FIG. 1 is as follows:

The service level class q, to which an individual packet belongs, can be identified on the basis of information attached to the packet (for example, DSCP=Differentiated Services Code Point [2]).

Packets are routed into service-level-specific FIFO queues 3-5 (aG+E, bG+E, and BE queues).

Each packet representing an aG+E or bG+E service level class belongs to an internal sub-group (p) in the service level class, on the basis of which it is possible to decide at least whether the packet in question belongs to the portion of the traffic that corresponds to the minimum transmission speed order in the service level agreement (SLA), (this will be subsequently referred to as the G portion), or whether the packet belongs to the portion of the traffic that exceeds the ordered minimum transmission speed (this will be subsequently referred to as the E portion). Membership of a specific sub-group p can be indicated, for example, with the aid of drop precedence information carried by the DSCP [2]. The sub-group information is used when congestion requires a decision to be made as to the packets in the queue or arriving in the queue on which congestion limitation measures should be imposed. An example of this is the WRED method (Weighted Random Early Detection) [3, 4].

The capacity of the transmission link is scheduled between the aG+E, bG+E, and BE queues 5, using a weighting coefficient based scheduling method (for example SFQ [1]). In a congestion situation, the capacity of the transmission link is divided between the aG+E, bG+E, and BE service level classes, in a ratio determined by the corresponding weighting coefficients ($W_{aG+E}$: $W_{bG+E}$: $W_{BE}$).

In the scheduling method shown in FIG. 1, the weighting coefficients $W_{aG+E}$, $W_{bG+E}$, and $W_{BE}$ are chosen while bearing in mind that the traffic representing the service level classes aG–E, and bG+E must receive the portions of the capacity of the transmission link reserved for them. A problem in the system shown in FIG. 1 is that, in addition to meeting the aforementioned requirement, it is not possible to define the weighting coefficient by which the E portions of the traffic representing the service level classes aG+E and b+E and the BE traffic will compete for the portion of the capacity of the transmission link that is not either reserved for the use of traffic representing some service level class, or is reserved, but is not being used at the moment in question by traffic entitled to the reservation.

FIG. 2 shows a method according to the prior art disclosed in reference [5] (confidential at the time of writing the present application), in which the value of the scheduling weight depends on both the quality class (q) and the sub-group (p). It is then possible to separately define 1) what relative portion of the capacity of the transmission link will be given to the portion of traffic of each service level class that corresponds to the ordered minimum transmission speed (the G portions of aG+E and bG+E) and 2) with what weighting coefficient the traffic portion, which exceeds the ordered minimum transmission speed (the E portions of aG+E and bG+E and BE), will compete for that portion of the capacity of the transmission link, which is not at the moment under examination being used by a traffic portion (the G portions of aG+E and bG+E) representing the minimum transmission speed ordered for some service level class.

In the system according to FIG. 2, the traffic portions (the G portions of aG+E and bG+E) entitled to the reservations should be given, on the one hand, sufficiently large scheduling weights relative to the scheduling weights of the traffic portions (BE and the E portions of aG+E and bG+E) unentitled to the reservations, so that it is possible to ensure that the traffic portions entitled to the reservations receive the use of the transmission capacity portions reserved for them, even in a congestion situation. On the other hand, however, the scheduling weights in questions should be small enough so that the overbooking to be used in traffic portions entitled to the reservations will reduce the performance of only the service level class in which overbooking is used. A problem in the system according to FIG. 2 is that it is only in exceptional cases that the said requirements affecting the scheduling weights (ensuring reservations, division of the available transmission capacity into the desired ratios, and controlled overbooking) will not be mutually contradictory.

An additional problem in the methods shown in FIGS. 1 and 2 is that, in a situation in which, for example, the queue 3 of the aG+E quality class has become congested in the quality class in question due to overbooking being used, the congestion limitation mechanism (e.g., WRED [3, 4]) will not be able to limit the length of the queue in a manner corresponding to that in a situation, in which the congestion is due to traffic representing the E portion being offered. This is because the congestion limitation mechanism uses sub-group information (e.g., drop precedence) to decide which packets to apply the congestion limitation measures to, when the queue length and/or a variable derived from it exceeds a specific threshold value. If the sub-group information states that the packet belongs to the G portion, a higher threshold value is used, which the queue length or its derivative must exceed before a congestion limitation measure is applied to the packet in question, than in a situation in which the packet being examined belongs to the E portion. When using overbooking, the queue can become already congested due to the effect of only the G portion. Any increase in the length of the queue will increase the transmission delay and hampers the operation of, for instance, TCP protocol flow control and monitoring mechanisms [6].

The present invention is intended to eliminate the defects of the state of the art described above and for this purpose create an entirely new type of method and equipment for scheduling transmission link capacity between packet-switched traffic flows. The object of the invention is a method, by means of which a scheduler and congestion management mechanism can be implemented, in such a way that the following properties are achieved:

1) A specific portion of the capacity of the transmission link can be reserved for traffic representing a specific service level class, and
2) it is possible to define the weighting coefficient by which each portion of the traffic of the service level class, which exceeds the capacity of the portion of the transmission link reserved for the service level class in question, will compete for the portion of the capacity of the transmission link, which is either not reserved for the use of traffic representing some service level class, or which is reserved but is not being used at the moment in question by traffic entitled to the reservation, and
3) it is possible to use overbooking in such a way that the reduction in the quality of the service caused by overbooking only affects the service level class, in which overbooking is used (controlled overbooking), and
4) an increase in the queue length that is detrimental in terms of the traffic-flow control (e.g., using the TCP protocol [6]) can be prevented even in a congestion situation arising from overbooking.

The invention is based on measuring the traffic flow coming to be scheduled, in which the traffic flow mentioned is formed of packets arriving in a queue representing a specific service level class, or some of the packets in question, and the operation of the scheduler (e.g., SFQ [1]) and the congestion-limitation mechanism (e.g., WRED [3, 4]) is controlled on the basis of the measurement.

The use of the method according to the invention purely to control the scheduler mechanism does not prevent the use of a traditional congestion limitation method based on sub-group information (e.g., drop precedence). Using the method according to the invention purely to control a congestion limitation mechanism does not prevent the use of scheduling methods according to the prior art.

The measurement result can be a single number, the value of which expresses information to be utilized in control, or many number (vector), the values of which express information to be utilized. In the following, the measurement result will be treated as a vector formed of several sub-results, as it is the most general approach.

The method according to the invention is characterized by what is stated in the characterizing portion of Claim 1.

The equipment according to the invention is, in turn, characterized by what is stated in the characterizing portion of Claim 8.

The use of the invention achieves the advantage over solutions according to the prior art that it is possible to implement the scheduler and congestion-limitation mechanism in such a way that the reduction in quality arising from overbooking only affects the service level class in which overbooking is used and, in addition, can prevent an increase in the length of the queue that is detrimental to traffic-flow control, even in a congestion situation arising from overbooking.

In the following, the invention is examined in greater detail with the aid of examples according to the accompanying figures.

The theoretical basis of the method according to the invention will become apparent from the following examination.

In the weighting-coefficient-based scheduling system, a sequence indication (for example, Start_tag SFQ in method [1]) is arranged for the packet in the input to the scheduler 1, to state when the packet in question will be in turn for forwarding. The first packet to be forwarded is that with a sequence indication value stating the earliest forwarding moment. The sequence indication need not be bound to real time, it is sufficient if the sequence indications of the packets are in a sensible relation to each other.

When forming the sequence indication, a weighting coefficient corresponding to the service level class in question is used for packets coming from a specific service level queue. If queue J1 has a greater weighting coefficient than queue J2, then the series of sequence indications of the consecutive packets of queue J1, relative to those of the corresponding ones of queue J2 is formed to be such that the queue J1 receives a larger portion of the capacity of the output of the scheduler 1.

In the priority-based scheduling system, the packets in the input of the scheduler are given a priority value. The priority values of the packets determine which packet is the next to be forwarded.

Figure 1:
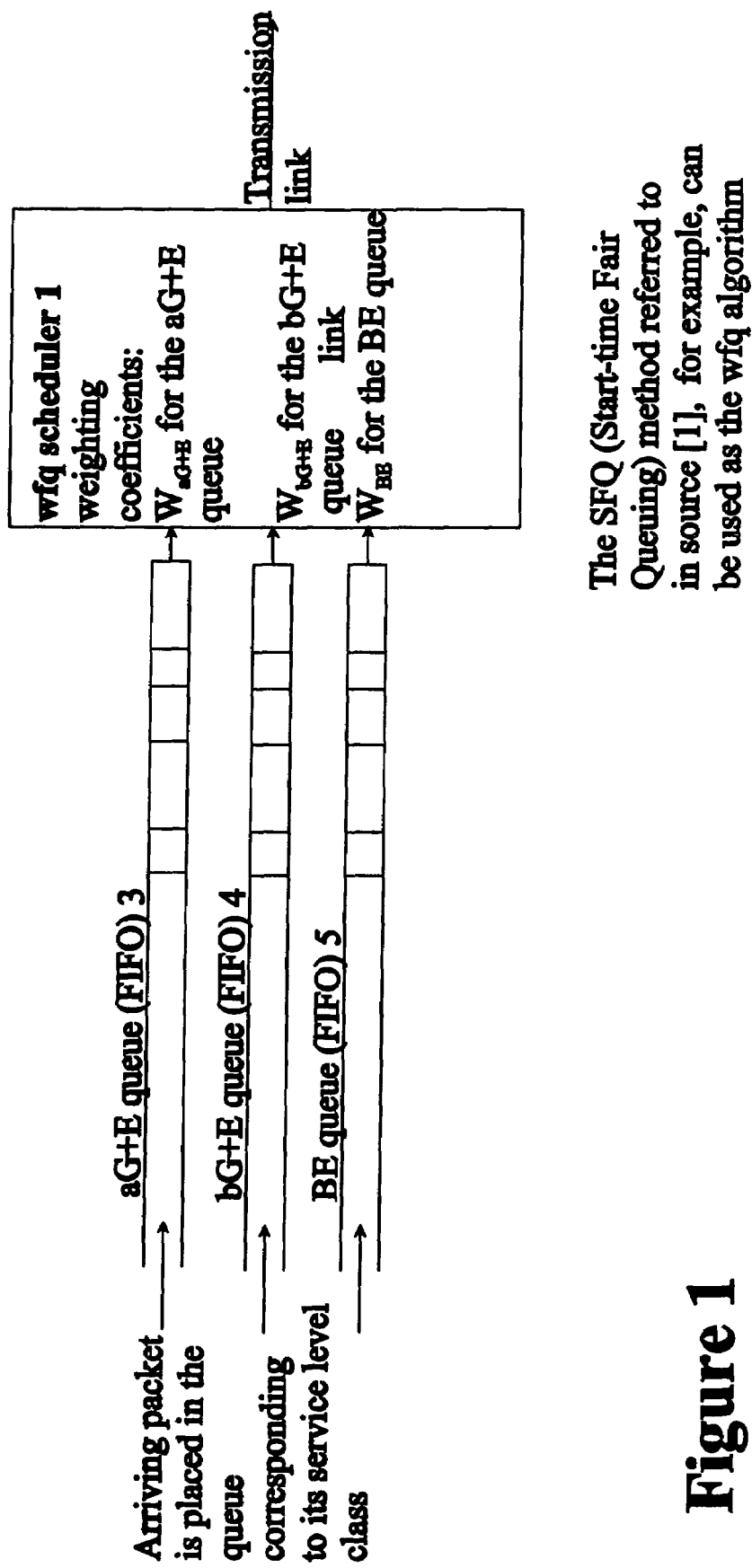
FIG. 1 shows a block diagram of one system according to the prior art, for scheduling the capacity of a common transmission link for traffic flows representing the aforementioned service level classes (aG+E, bG+E, BE).
Figure 2:
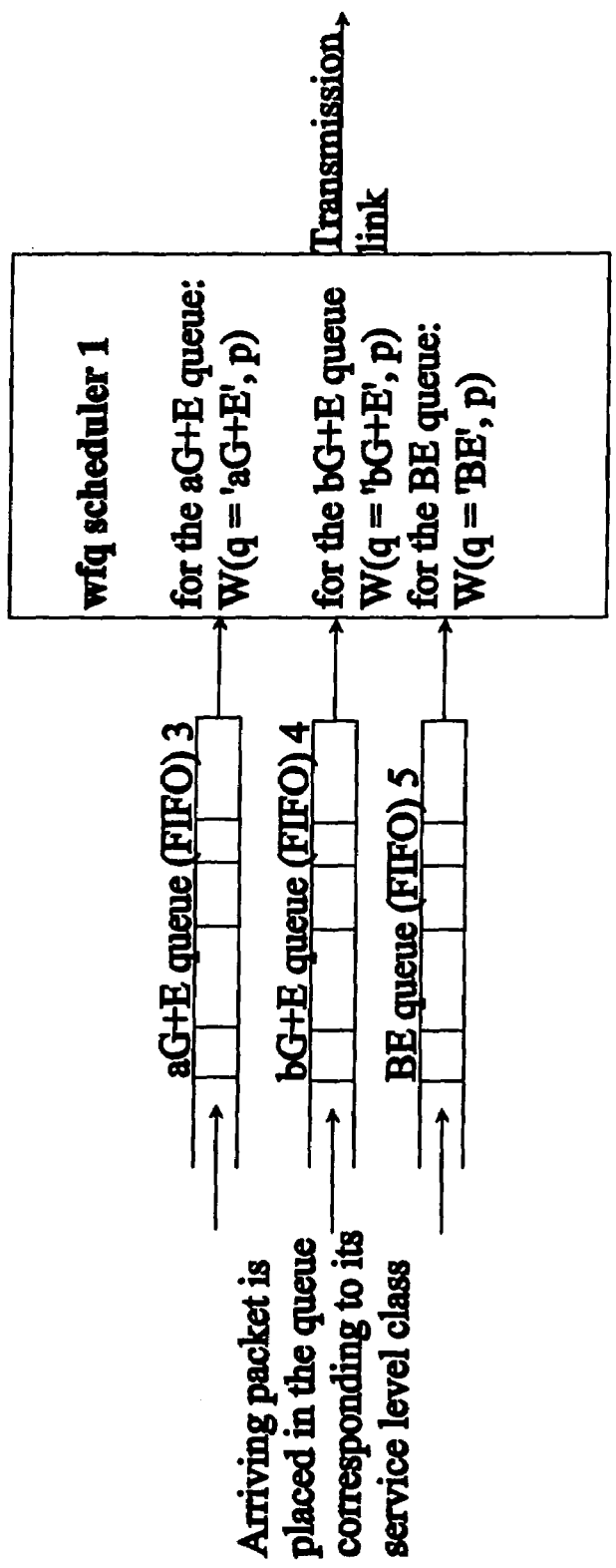
FIG. 2 shows a block diagram of a second system according to the prior art, for scheduling the capacity of a common transmission link for traffic flows representing the aforementioned service level classes.
Figure 3:
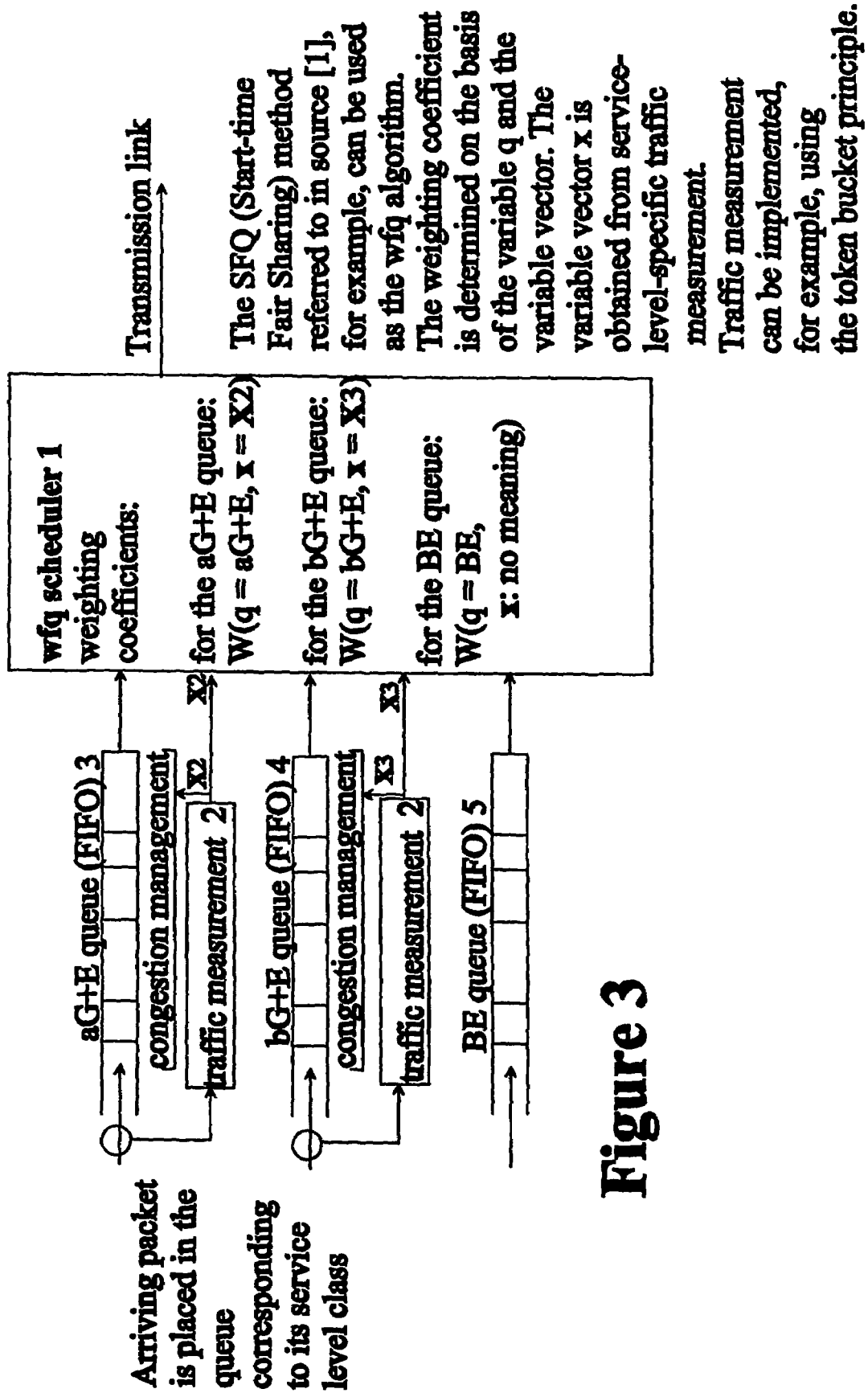
FIG. 3 shows a block diagram of a system according to the invention, for scheduling the capacity of a common transmission link for traffic flows representing the aforementioned service level classes.

In the method according to the invention, the priority value given to the packet, or the weighting coefficient used in forming the sequence indication does not depend only on the service level class represented by the packet (which is this publication is referred to as the variable q), but also on the result (which in this publication is referred to as the variable vector x) provided by the measurement 3 made from the traffic flow of the service level class in question on from the portion of the traffic flow in question, FIG. 3.

In the method according to the invention, the measurement datum/data can also determine whether the weighting coefficient or priority-based scheduling method is used to make the scheduling decision for a specific packet.

In congestion management, the length of the queue or a variable derived from it, such as a low-pass filtered value, is utilized. If the length of the queue and/or its derivative exceeds a specific threshold value, congestion limitation measures are applied to specific packets in the queue or arriving in it. The congestion limitation measures can be packet dropping (discarding) or marking (ECN method [2]). The selection of packets within a specific service level class, to which the congestion limitation measures are applied, is based on sub-group information (e.g., drop precedence) in a congestion management method representing the prior art. The principle is that, for example, in the case of class aG+E, the congestion limitation measures are applied to the packets representing the service level class in question, which, on the basis of the sub-group information, belong to the E portion. If the increase in the length of the queue does not stop by dropping (or marking) packets representing the E portion, packets representing the G portion are also begun to be dropped (marked). In the WRED method, this is implemented in such a way that the threshold value of the queue length, or the variable derived from it defined for the G portion is greater than the corresponding threshold value defined for the E portion. Unless overbooking is being used, the dropping (or marking) of purely packets representing the E portion should already prevent congestion, as the necessary transmission capacity has been reserved for the traffic representing the G portion. If overbooking is used, the queue can continue to increase even in a situation in which congestion limitation measures are already being applied to all packets representing the E portion. This is due to the fact that, when using overbooking (as defined), it is possible for a greater amount of traffic representing the G portion, than the transmission capacity reserved for the G portion to attempt to reach the transmission link. In that case, the length of the queue is limited on the basis of the threshold value defined for the G portion. However, in terms of the delay behaviour and flow management (e.g., TCP), it is preferable for the length of the queue to remain as short as possible. This is attempted, for example, using the WRED algorithm in such a way that the threshold value, after which packets representing the E portion are begun to be dropped (or marked) is low. On the other hand, a low threshold value cannot be used for the G portion, in order to achieve a clear dropping/marking hierarchy-limitation measures are applied first of all to the E portion and only after that to the G portion. Thus, in a congestion situation caused by overbooking, for example, the basic objective of the WRED algorithm of keeping the queue short is not met.

In the method according to the invention, the problem described above relating to the length of the queue is solved by using measurement results x, FIG. 3, instead of, or along with the sub-group information in congestion management.

The following illustrates the operation of the scheduling and congestion management method according to one embodiment of the invention in the case of traffic flows belonging to the classes aG+E and bG+E, using the SFQ scheduling algorithm [1] and the WRED congestion management algorithm [3, 4]. In this embodiment of the invention, the packet-specific weighting coefficient is defined on the basis of the measurement results as follows:

For the portion of a traffic flow representing the service level class aG+E, for which, in the case of the packet being examined, the measured number of bits transmitted is, during an arbitrary examination period T from the past to the present less than CIR×T+CBS, the packet-specific weighting coefficient $W_{aG+E}=W_{ga}$, for the excess portion $W_{aG+E}=W_{Ea}$. Correspondingly, in the service level class b+E, the weighting coefficient $W_{bG+E}=W_{Gb}$ or $W_{Eb}$. CIR is the available transmission band (committed information rate [bit/s]) reserved from the G portion of the service level class, which, when using overbooking is less than the largest possible amount [bit/s] of traffic representing the G portion. CBS is the largest permitted burst size [bit] (committed burst size). The measurement described here can be implemented using, for example, the Token Bucket method [7].

The portion of traffic formed of packets belonging to the aG+E (bG+E) service level class, for which $W_{bG+E}=W_{Ga}$ ($W_{bG+E}=W_{Gb}$) is valid, will subsequently be termed the g portion, and correspondingly the portion of the traffic formed of packets, for which $W_{aG+E}=W_{Ea}$ ($W_{bG+E}=W_{Eb}$), will be termed the e portion.

The sequence indications ($S_{aG+E}(i)$ and $S_{bG+E}(j)$) of an aG+E class packet i and of a bG+E class packet j are calculated as follows:

$$S_{aG+E}(i)=\max\{v, S_{aG+E}(i-1)+L(i-1)/W_{aG+E}\}, \quad (1)$$

$$S_{bG+E}(j)=\max\{v, S_{bG+E}(j-1)+L(j-1)/W_{bG+E}\}, \quad (2)$$

in which L(i−1), L(j n−1) are the size of the preceding packet (for example, in bits) and v is the sequence indication (virtual time) of the packet being forwarded at the time of inspection. The sequence indiction is calculated when the packet arrives at the quality-level-specific input of the SFQ mechanism, nor it is updated later, even if v changes. The next packet to be forwarded is selected as the packet (i or j) with the smaller sequence indication.

A simple test or simulation can be used to demonstrate the following: if the packets of service level class aG+E being transmitted during a specific period of time belong to the g portion of aG+E and the service level class bG+E packets being transmitted belong to the e portion of bG+E, then the ratio of the bytes (or bits) carried by the aG+E and bG+E service level class packets being transmitted during the period in question is $W_{Ga}$: $W_{Eb}$. The examination gives a better illustration, if all the packets are assumed to be of the same size. It is then possible to speak simple of packets, instead of speaking of packets representing bits or bytes. By selecting suitable weighting coefficients $W_{Gb}$, $W_{Ea}$, $W_{Gb}$, $W_{Eb}$, it is possible to define how many packets representing the g or e portions of the service level class aG+E are transmitted relative to the packets representing the g or e portions of the service level class bG+E.

One variation of this embodiment is created in such a way that $W_{Ga}=W_{Gb}$, $W_{Ea}=W_{Eb}$, and $W_{Ga} \gg W_{Ea}$ ($W_{Gb} \gg W_{Eb}$), e.g., $W_{Ga}=10000 \times W_{Ea}$. In fact, this corresponds in practice to the packets belonging to the g portion being scheduling using a priority principle in such a way that the g portions of the service level classes aG+E and bG+E have a mutually equal scheduling priority. This is possible, because the g portions are limited in such a way that the transmission band they require is available.

In this embodiment of the invention which is described, the selection of the packets inside the service level class aG+E or bG+E, to which congestion limitation measures are applied, is not based on sub-group information, but instead of whether the packet being examined belongs to the g or e portion. The principle is that congestion limitation measures are applied first of all to packets representing the e portion. If the increase in the length of the queue does not stop by dropping (or marking) packets representing the e portion, packets representing the g portion are also begun to be dropped (marked). In the WRED method, this is implemented in such a way that the threshold value defined for the g portion, which the length of the queue or a derivative of it must exceed before packets belonging to the g portion are begun to be dropped (or marked), is greater than the corresponding threshold value defined for the e portion.

Because the g portions of the service level classes aG+E and bG+E are limited in such a way that the transmission band required by them is available, the dropping (or marking) of purely the packets representing the e portions will already prevent congestion. Thus, the length of the queue in congestion situations is determined by the threshold value set for the e portion, which can be selected to be low.

One preferred variation of this embodiment is achieved in such a way that the measuring function is applied only to the G portion and the packets that do not belong to the G portion are processed in the e portion. Thus, it is possible to ensure that the greatest possible share of the packet that belong to that portion of the traffic, which corresponds to the transmission speed promised in the service level agreement (G portion), will be processed in the g portion. The application of the measurement to only the G portion can be implemented on the basis of sub-group information (p, e.g., drop precedence).

REFERENCES

[1] Pawan Goyal, Harric M. Vin, Haichen Cheng. *Start-time Fair Queuing: A Scheduling Algorithm for Integrated Services Packet Switching Networks*. Technical Report TR-96-02, Department of Computer Sciences, University of Texas Austin.

[2] Bruce Davie, Yakov Rekhter. *MPLS Technology and Applications*. Academic Press 2000 CA U.S.A. (www.academic.press.com)

[3] Sally Floyd, Van Jacobson. *Random Early Detection Gateways for Congestion Avoidance*. Lawrence Berkeley Laboratory 1993, University of California.

[4] A description of the WRED algorithm can be found at the Internet address: http://www.jumper.net/techncenter/techpapers/200021-01.html.

[5] Janne Väänänen. Menetelmä ja Laitteisto Sürtoyhteyskapasiteetin Vuorottamiseksi Packettikytkentäisten Tietoliikennevoident Kesken (*Method and Equipment for Sequencing Transmission Capacity Between Packet-Switched Data Traffic Flows*), Finnish patent application No. 20021921, Helsinki Finland 2002.

[6] Douglas E. Corner. *Internetworking with TCP/IP*, Third Edition. Prentice Hall International Editions, U.S.A. 1995.

[7] P. F. Chimento. *Standard Token Bucket Terminology*. http://qbone.internet2.edu/bb/Traffic.pdf 2000.

The invention claimed is:

1. A method for controlling the congestion management and the scheduling of transmission link capacity in packet-switched telecommunications, in which method digital information is transmitted as constant or variable-length packets, identifier data is attached to the packets, on the basis of which the packets are divided into at least two different service level classes, on the basis of the service level class data, each packet is routed to one of the FIFO queues, which are one for each service level class, at least one service level class is such that identifier data is attached to the packets belonging to it, with the aid of which the packets are divided into at least two internal sub-groups in the service level class, the packets belonging to the same service level class form a flow, in which the transmission order of the packets is retained, the available capacity of outgoing link or links of a system is scheduled for the service-level-class-specific FIFO queues using a weighting-coefficient-based scheduling method, a priority-based scheduling method, or a combination of these methods, and congestion in the service-level-class-specific FIFO queues is limited by dropping or marking packets in the queue or arriving in the queue, wherein a packet-specific priority value in the priority-based scheduling and/or a weighting coefficient in the weighting-coefficient-based scheduling is defined from a joint effect of a variable q and a variable vector x and that a selection of packets within a specific service level class, to which packets dropping or marking will be applied in a congestion situation, are defined from an effect of the variable vector x, in which the variable q is defined from the service level class, to which the traffic represented by the packet in question belongs, and the variable vector x is formed of the results provided by measurement applied to the traffic flow representing the service level class being examined, said measurement results depending on temporal variation in data transmission speed of the traffic representing the traffic flow being examined and on distribution between different sub-groups of packets representing the traffic flow being examined.

2. The method according to claim 1, wherein the temporal variation in the data transmission speed is depicted using a double-value variable, which states whether the number of bits transmitted during an arbitrary monitoring interval T from the past to the present is less than CIR×T+CBS, in which CIR is the transmission band available to the service level class being examined (committed information rate) and CBS is the greatest permitted burst size (committed burst size).

3. The method according to claim 1, wherein the SFQ (Start-time Fair Queuing [1]) method is used as the weighting-coefficient-based scheduling method.

4. The method according to claim 1, wherein the WFQ (Weighted Fair Queuing [1]) method is used as the weighting-coefficient-based scheduling method.

5. The method according to claim 1, wherein the WRED (Weighted Random Early Detection [3, 4]) method is used as the congestion limitation method controlled by the variable vector x.

6. The method according to claim 1, wherein the information contained in the variable vector x is formed using the Token Bucket method [7].

7. Equipment for controlling the congestion management and scheduling of transmission link capacity in packet-switched telecommunications, in which the equipment includes means for receiving constant or variable-length packets carrying digital information, means for reading the identifier data attached to the packets, on the basis of which the packets can be divided into at least two different service level classes, means for dividing the packets into at least two different service level classes, a FIFO queue for each of the service level classes, means for routing a packet in the FIFO queue corresponding the relevant service level class, on the basis of the service level class data, means for reading identifier data attached to the packets, on the basis of which the internal sub-group of the service level class, to which the packet in question belongs, can be determined, a scheduler for scheduling the available capacity of outgoing link or links from a system to the service-level-class-specific FIFO queues, using a weighting-coefficient-based scheduling method, a priority-based scheduling method, or a combination of these, means for sending packets to the outgoing link or links, in a transmission order defined by the scheduler, and means for limiting the congestion of the service-level-class-specific FIFO queues, by dropping or marking packet in a queue or arriving in a queue, wherein the equipment includes means, with the aid of which a packet-specific priority value can be defined in the priority-based scheduling and/or a weighting coefficient can be defined in the weighting-coefficient-based scheduling on a basis of a joint effect of a variable q and a variable vector x, and with the aid of which means selection of packets within the service level class, to which packets dropping or marking is applied in a congestion situation, can be defined from an effect of the variable vector x, in which the variable q is defined from a service level class, to which the traffic represented by the packet in question belongs, and the variable vector x is formed of the results provided by measurement applied to the traffic flow representing the service level class being examined, said measurement results depending on temporal variation in data transmission speed of the traffic representing the traffic flow being examined and on distribution between different sub-groups of the packets representing traffic flow being examined.

8. The equipment according to claim 7, wherein the equipment includes means, with the aid of which a double-value variable can be formed, which states whether the number of bits transmitted during an arbitrary monitoring interval T from the past to the present is less than CIR×T+CBS, in which CIR is the transmission band available to the service level class being examined (committed information rate) and CBS is the greatest permitted burst size (committed burst size).

9. The equipment according to claim 7, wherein the equipment includes means for performing weighting-coefficient-based scheduling using the SFQ (Start-time Fair Queuing [1]) method.

10. The equipment according to claim 7, wherein the equipment includes means for performing weighting-coefficient-based scheduling using the WFQ (Weighted Fair Queuing [1]) method.

11. The equipment according to claim 7, wherein the equipment includes means, with the aid of which congestion limitation controlled using the variable vector x can be performed using the WRED (Weighted Random Early Detection [3, 4]) method.

12. The equipment according to claim 7, wherein the equipment includes means for forming the information contained in the variable vector x using the Token Bucket method [7].

* * * * *